United States Patent
Ho et al.

(10) Patent No.: US 9,428,164 B2
(45) Date of Patent: Aug. 30, 2016

(54) VALVE ASSEMBLY

(71) Applicant: Bendix Commercial Vehicle Systems LLC, Elyria, OH (US)

(72) Inventors: Thanh Ho, Brunswick, OH (US); Robert J. Herbst, Avon, OH (US); David J. Taneyhill, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 358 days.

(21) Appl. No.: 13/781,083

(22) Filed: Feb. 28, 2013

(65) Prior Publication Data

US 2014/0239217 A1    Aug. 28, 2014

(51) Int. Cl.
*F16K 37/00* (2006.01)
*B60T 8/36* (2006.01)
*F16K 27/04* (2006.01)
*B60T 13/68* (2006.01)
*B60T 15/36* (2006.01)

(52) U.S. Cl.
CPC ............... *B60T 8/362* (2013.01); *B60T 13/683* (2013.01); *B60T 15/36* (2013.01); *F16K 27/041* (2013.01); *F16K 37/0041* (2013.01)

(58) Field of Classification Search
CPC .............. F16K 27/029; F16K 31/0655; F16K 37/0025; F16K 37/0033; F16K 37/0041; F16K 37/0083; B60T 13/683; B60T 15/027; B60T 17/221; B60T 2220/04; Y10S 277/925; F16J 15/021
USPC ........... 137/554; 251/129.15, 214; 303/119.2; 277/642, 609, 616, 925
See application file for complete search history.

(56) References Cited

U.S. PATENT DOCUMENTS

| | | | |
|---|---|---|---|
| 4,690,371 A | | 9/1987 | Bosley et al. |
| 4,893,750 A | | 1/1990 | Haworth et al. |
| 4,915,136 A | * | 4/1990 | Bartholomew ................. 138/89 |
| 5,070,767 A | * | 12/1991 | Yuda ............................. 92/128 |
| 5,080,133 A | | 1/1992 | Johnson et al. |
| 5,143,118 A | | 9/1992 | Sule |
| 5,241,218 A | | 8/1993 | Page |
| 5,456,161 A | * | 10/1995 | Yuda ................... F15B 15/1442 277/643 |
| 5,603,482 A | | 2/1997 | Mott et al. |
| 5,796,261 A | | 8/1998 | Golab |
| 5,804,123 A | | 9/1998 | Klomhaus et al. |

(Continued)

FOREIGN PATENT DOCUMENTS

| | | |
|---|---|---|
| DE | 19537963 A1 | 4/1997 |
| EP | 0899755 A1 | 3/1998 |

(Continued)

*Primary Examiner* — Matthew W Jellett
(74) *Attorney, Agent, or Firm* — Brian E. Kondas; Cheryl L. Greenly; Eugene E. Clair

(57) ABSTRACT

A valve assembly includes a plate defining a wall of a housing and a valve component included in the housing. A position of the valve component sets a state of the valve assembly. A channel is defined through the wall of the housing. A channel groove is defined along a wall of the channel. A sensor housing includes a sensor detecting a state of the valve assembly. A sensor groove is along the sensor housing. A seal cooperates with both the channel groove and the sensor groove when the sensor housing is seated in the channel to both create a pneumatic seal between the sensor housing and the wall of the channel and retain the sensor housing in the channel.

30 Claims, 3 Drawing Sheets

(56) References Cited

U.S. PATENT DOCUMENTS

| | | |
|---|---|---|
| 5,839,469 A | 11/1998 | Burke |
| 6,033,037 A | 3/2000 | Eckert |
| 6,152,172 A | 11/2000 | Christianson et al. |
| 6,196,172 B1 | 3/2001 | Cosfeld et al. |
| 6,300,733 B1 | 10/2001 | Bergstrom |
| 6,321,781 B1 | 11/2001 | Kurth |
| 6,374,679 B1 * | 4/2002 | Babala et al. .................... 73/715 |
| 6,588,262 B2 | 7/2003 | Kirzhner et al. |
| 6,634,261 B1 | 10/2003 | Griffin |
| 6,657,847 B1 | 12/2003 | Wright et al. |
| 6,945,510 B2 * | 9/2005 | Dralyuk .................... 251/129.15 |
| 7,325,463 B2 | 2/2008 | Morrison et al. |
| 7,516,942 B2 | 4/2009 | Grau et al. |
| 7,517,145 B2 * | 4/2009 | Seo et al. ...................... 374/147 |
| 7,530,843 B1 | 5/2009 | Tesfay et al. |
| 7,628,378 B2 | 12/2009 | Adams et al. |
| 7,658,366 B2 * | 2/2010 | Larsen .......................... 251/282 |
| 2001/0027759 A1 | 10/2001 | Toriumi |
| 2001/0035213 A1 | 11/2001 | Yoneda et al. |
| 2002/0023625 A1 | 2/2002 | Sturman |
| 2003/0006729 A1 | 1/2003 | Raymond |
| 2003/0106511 A1 | 6/2003 | Haskara et al. |
| 2008/0093172 A1 | 4/2008 | Albertson et al. |
| 2008/0284418 A1 | 11/2008 | Lueck |
| 2008/0290313 A1 * | 11/2008 | Larsen .......................... 251/337 |
| 2008/0290974 A1 | 11/2008 | Adams et al. |
| 2009/0309413 A1 | 12/2009 | Bensch et al. |

FOREIGN PATENT DOCUMENTS

| | | |
|---|---|---|
| GB | 1324372 | 7/1973 |
| GB | 2110373 A | 6/1983 |
| GB | 2243488 A | 10/1991 |
| GB | 2298519 A | 9/1996 |
| WO | 02066931 A1 | 8/2002 |
| WO | 2005005077 A1 | 1/2005 |

* cited by examiner

VALVE ASSEMBLY

BACKGROUND

The present invention relates to a sensor for detecting a state of a valve. It finds particular application in conjunction with a sensor sensing a position of a shuttle in the valve and will be described with particular reference thereto. It will be appreciated, however, that the invention is also amenable to other applications.

Some valve assemblies include a solenoid for setting the valve between an opened state and a closed state. A shuttle is commonly included in a housing of the valve assembly and moves between two (2) respective positions associated with the opened and closed states. The shuttle moves in the housing based on the presence or absence of pressure provided by the solenoid.

For various reasons, at times it is desirable to determine the state of the valve to, for example, confirm the shuttle is positioned properly when the valve is set to the respective opened and closed states. Therefore, a sensor package is positioned in the valve assembly to sense a position of the shuttle.

The present invention provides a new and improved sensor package and method for securing the sensor package to the valve assembly.

SUMMARY

In one embodiment, a valve assembly includes a plate defining a wall of a housing and a valve component included in the housing. A position of the valve component sets a state of the valve assembly. A channel is defined, through the wall of the housing. A channel groove is defined along a wall of the channel. A sensor housing includes a sensor detecting a state of the valve assembly. A sensor groove is along the sensor housing. A seal cooperates with both the channel groove and the sensor groove when the sensor housing is seated in the channel to both create a pneumatic seal between the sensor housing and the wall of the channel and retain the sensor housing in the channel.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
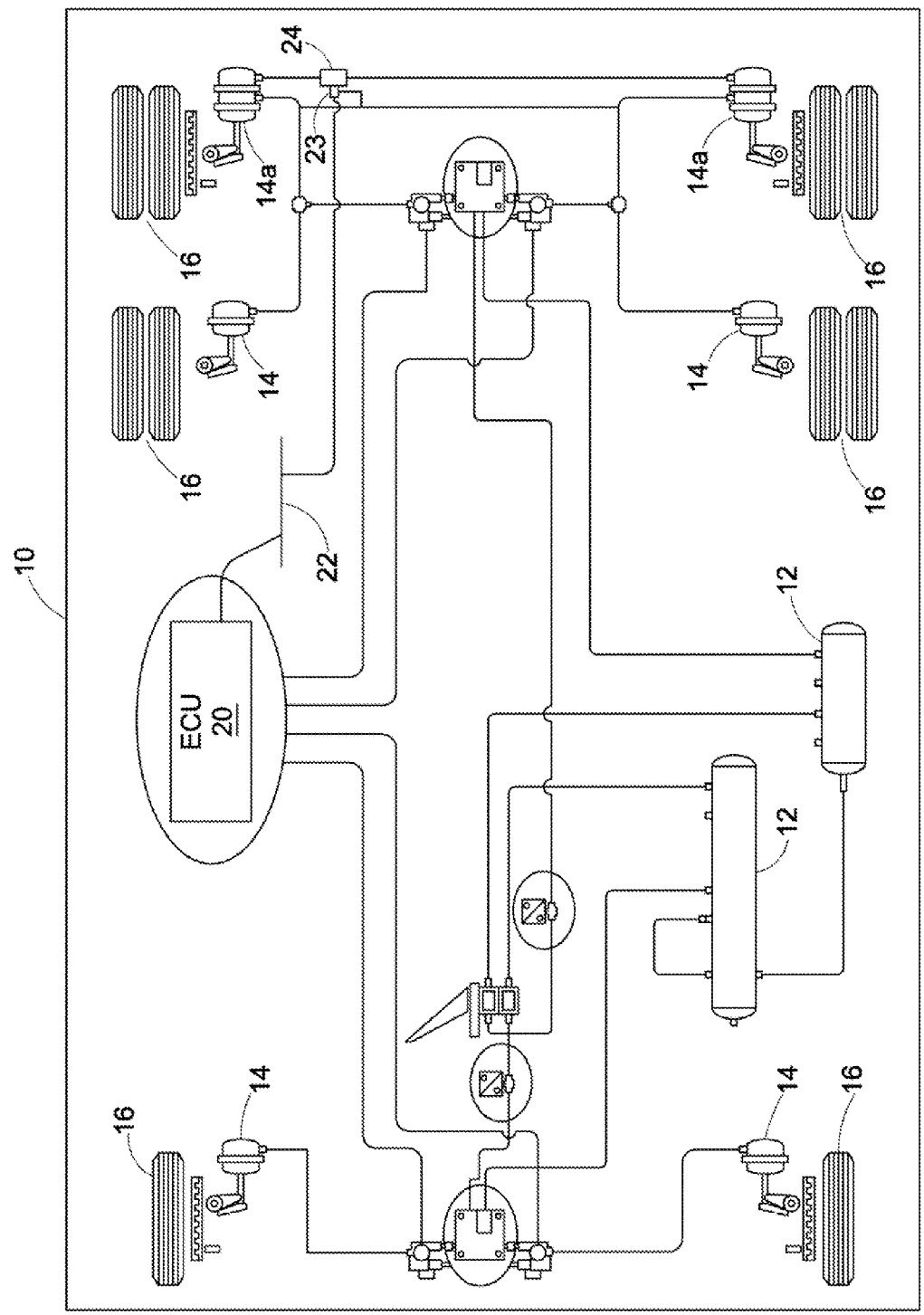
FIG. 1 illustrates a schematic representation of a vehicle in accordance with one embodiment of an apparatus illustrating principles of the present invention.

With reference to FIG. 1, a simplified component diagram of a vehicle 10 including a compressed air braking system is illustrated in accordance with one embodiment of the present invention. The vehicle 10 includes reservoirs 12 that store compressed air for operating both service brakes and parking brakes associated with respective brake chambers 14 on wheels 16 of the vehicle 10. An electronic control device 20 (ECU) controls delivery of the compressed air from the reservoirs 12 to the brake chambers 14 for applying and releasing the service brakes. Two (2) of the brake chambers 14a are controlled by the ECU 20 for deliver of the compressed air from the reservoirs 12 for applying and releasing both the service brakes and parking brakes.

In one embodiment, the parking brakes are applied electronically by the ECU 20. For example, the ECU 20 transmits a signal to a vehicle communication bus 22 to signal a valve 23 (e.g., a solenoid) on a valve assembly 24 to cause compressed air to be released from the brake chambers 14a for applying the parking brakes. The ECU 20 also transmits a signal to the vehicle communication bus 22 for causing compressed air to build pressure in the brake chambers 14a for releasing the parking brakes.

Figure 2:
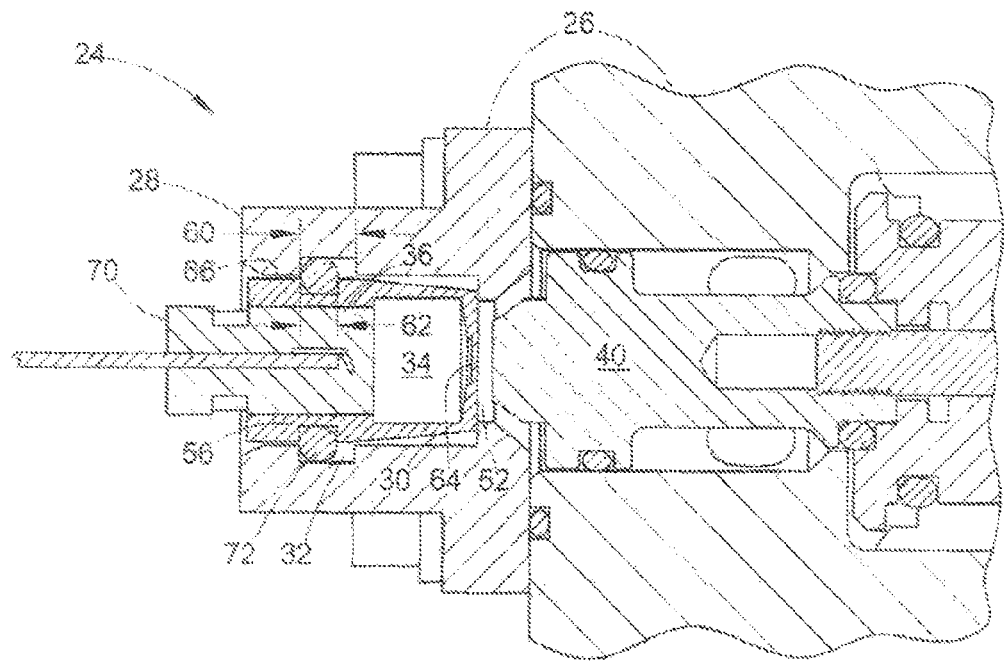
FIG. 2 illustrates a schematic representation of a valve assembly in a first state in accordance with one embodiment of an apparatus illustrating principles of the present invention.

With reference to FIG. 2, a simplified component diagram of an exemplary valve assembly 24 used for releasing and building pressure to apply and release the parking brakes is illustrated in accordance with one embodiment of the present invention. The valve assembly 24 includes a valve housing 26 including a plate 28 defining a wall of the housing 26. A channel 30 is defined in the plate 28 (e.g., wall) of the housing 26. In one embodiment, the channel 30 passes through the plate 28 (e.g., wall) of the housing 26. A channel groove 32 is defined along a wall of the channel 30. A sensor 34 is included in a sensor housing 36.

Figure 3:
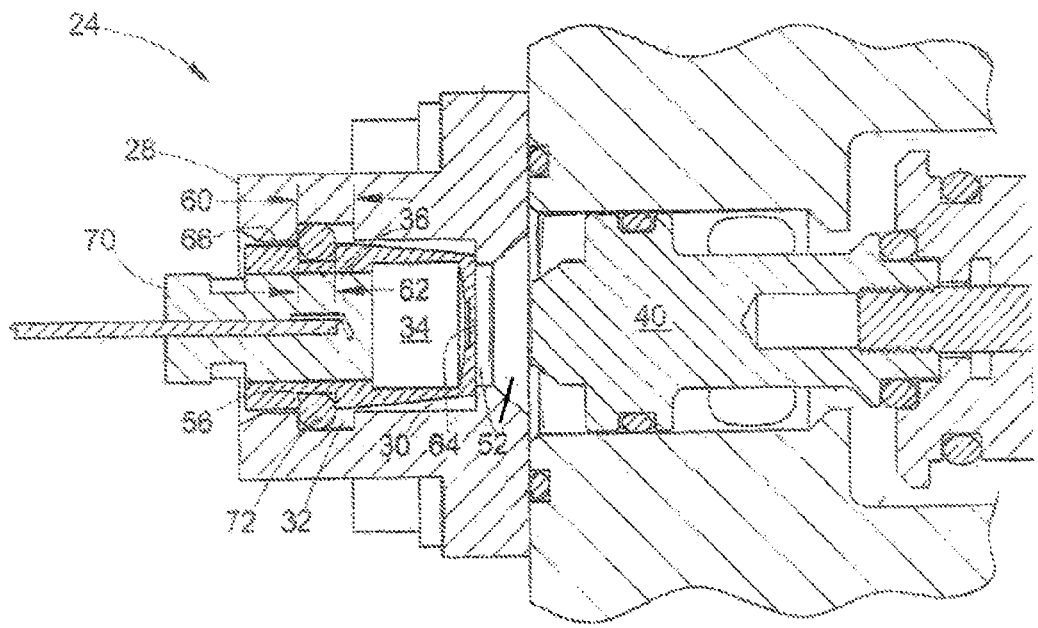
FIG. 3 illustrates a schematic representation of the valve assembly of FIG. 2 in a second state in accordance with one embodiment of an apparatus illustrating principles of the present invention.

A valve component 40 is movably positioned in the valve housing 26. A state of the valve assembly 24 is set by the position of the valve component 40 in the valve housing 26. For example, when the valve component 40 is in a first position (as illustrated in FIG. 2), the valve assembly 24 is set to a closed state, and when the valve component 40 is in a second position (as illustrated in FIG. 3), the valve assembly 24 is set to an opened state. When the valve assembly 24 is in the opened state, pressure ma build in the associated brake chamber 14a (see FIG. 1) for releasing the parking brakes. When the valve assembly 24 is in the closed state, pressure is released from the associated brake chamber 14a (see FIG. 1) for applying the parking brakes.

With reference to FIGS. 1-3, in one embodiment, the position of the valve component 40 in the valve housing 26 is controlled by the solenoid 23. Operation of the solenoid 23 is controlled by the electronic control unit (ECU) 20 on the associated vehicle 10. The ECU 20 communicates with the solenoid 23 via the vehicle communication bus 22 or via a direct link. As illustrated in FIG. 1, the solenoid 23 is integral (e.g., attached with) the valve assembly 24. However, in other embodiments, it is contemplated that the solenoid 23 is remote from the valve assembly 24. The ECU 20 sets the solenoid 23 to either a parking brake apply state or a parking brake release state based on, for example, the vehicle parking brake needs determined by the ECU 20.

During some operations of the valve assembly 24, there is pressure between the sensor 33 and the valve component 40

(e.g., pressure in a volume 52 (e.g., a chamber)) that controls the position of the valve component 40. The presence of the pressure in the volume 52 may be controlled by solenoid 23. The pressure (e.g., a value of the pressure), when present, is equivalent to a supply pressure of the compressed air braking system.

In one embodiment, the valve component 40 is a shuttle that is moved between the first and second positions based on the state of the solenoid 23. It is contemplated that the valve component 40 is a material, which may be sensed by the sensor 34. It is also contemplated that the sensor 34 is a non-contact sensor (e.g., a Hall Effect sensor) that senses changes to a magnetic field due to proximity to a metal object. For example, the valve component 40 is a ferrous material (e.g., steel) or includes ferrous material. The sensor housing 36 is positioned in the channel 30 so that the sensor 34 detects a position of the valve component 40 by sensing changes to a magnetic field created by proximity to the ferrous portion of the valve component 40. More specifically, the sensor 34 detects the valve component 40 when the valve component 40 is in the first position (e.g., when the valve assembly 24 is in the closed state) (see FIG. 2). On the other hand, when the valve component 40 is in the second position (e.g., when the valve assembly 24 is in the opened state) (see FIG. 3), the valve component 40 is physically located farther away from the sensor 34. Therefore, the sensor 34 does not sense the valve component 40 when the valve component 40 is in the second position. In one embodiment, the valve component 40 is within 0.050 inches of the sensor 34 when the valve component 40 is in the first position; and the valve component 40 is at least 0.150 inches away from the sensor 34 when the valve component 40 is in the second position.

It is contemplated that the plate 28 of the valve housing 26 is a metallic material. If both the valve component 40 and the plate 28 are metal, the sensor housing 36 is positioned in the channel 30 so that the sensor 34 and the valve component 40 are positioned close enough so that the sensor 34 accurately senses the valve component 40, without interference of a magnetic field from the metal plate 28, when the valve component 40 is in the first position e.g., when the valve assembly 24 is in the closed state).

The sensor 34 transmits a message to the ECU 20 via, for example, the vehicle communication bus 22 indicating either that the valve component 40 is sensed by the sensor 34 or that the valve component 40 is not sensed by the sensor 34. The ECU 20 interprets the message received from the sensor 34 and determines if the valve component 40 is in either the first position (i.e., the valve assembly 24 is in the closed state) or the second position (i.e., the valve assembly 24 is in the opened state).

Once the ECU 20 determines the position of the valve component 40 (and the state of the valve assembly 24), the ECU 20 reconciles the sensed position of the valve component 40 with the expected position of the valve component 40. For example, if the ECU 20 had previously transmitted a message to set the solenoid 23 to the parking brake apply state, the ECU 20 would expect that the valve component 40 is in the first position and, therefore, is sensed by the sensor 34. Similarly, if the ECU 20 had previously transmitted a message to set the solenoid 23 to the parking brake release state, the ECU 20 would expect that the valve component 40 is in the second position and, therefore, is not sensed by the sensor 34. If the ECU 20 determines the valve component 40 is not in the expected position, the ECU 20 sets a fault status, which will be identified by a service technician during a subsequent maintenance check of the vehicle. Optionally, the ECU 20 also notifies an operator of the vehicle of the fault by transmitting a message via the vehicle communication bus 22 to activate a visual and/or audible notification device in a cab of the vehicle. In this manner, the sensor 34 senses the position of the shuttle for confirming operation of the valve assembly 24.

As stated above, the sensor housing 36 is positioned in the channel 30. A sensor groove 56 is defined along the sensor housing 36. In one embodiment, the sensor groove 56 defines a circle around an exterior of the sensor housing 36; and the channel groove 32 defines a circle along the wall of the channel 30. It is contemplated that a width 60 of the channel groove 32 is greater than about 150% of a width 62 of the sensor groove 56. For example, in one embodiment, the width 62 of the sensor groove 56 is about 0.090", and the width 60 of the channel groove 32 is about 0.150".

Figure 4:
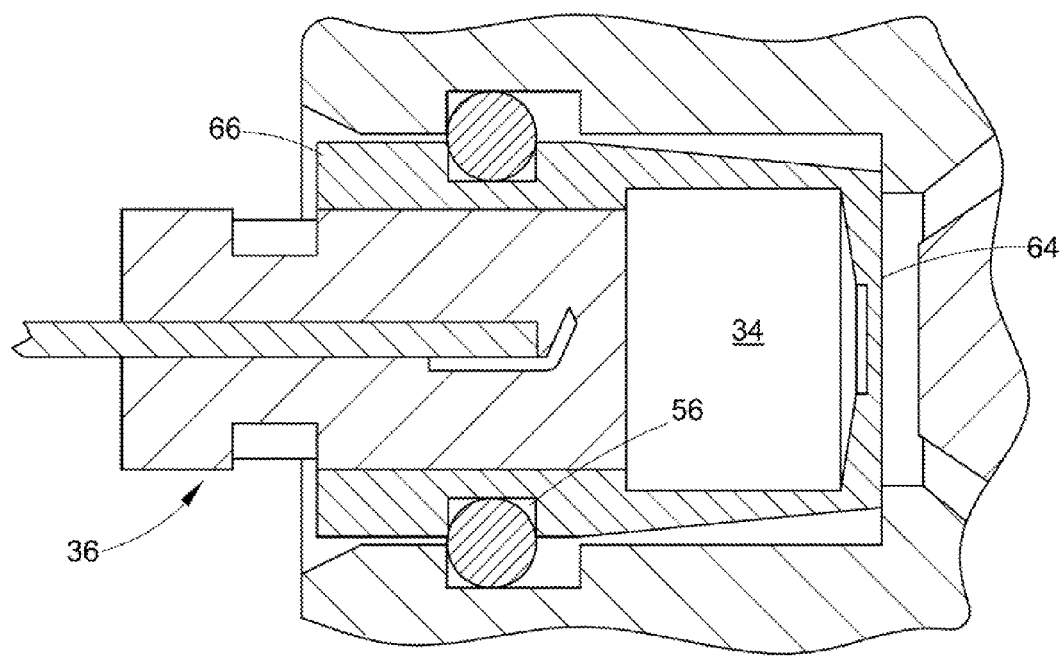
FIG. 4 illustrates a schematic representation of the valve assembly of a sensor housing in accordance with one embodiment of an apparatus illustrating principles of the present invention.

The channel 30 is substantially cylindrically shaped and sized to received the sensor housing 36. With reference to FIG. 4, at least a portion of the sensor housing 36 (e.g., a portion of the sensor housing 36 inserted into the channel 30) is substantially frusto-conically shaped. A diameter of the frusto-conically shaped portion of the sensor housing 36 at the end 64 of the sensor housing 36 proximate to the valve component 40 is smaller relative to the diameter of the frusto-conically shaped portion of the sensor housing 36 at the opposite end 66 of the sensor housing 36 proximate to the exterior 70 (see FIGS. 2 and 3) of the valve assembly 24. In one embodiment, the diameter of the frusto-conically shaped portion of the sensor housing 36 at the end of the sensor housing 36 proximate to the valve component 40 is about 0.400"; and the diameter of the frusto-conically shaped portion of the sensor housing 36 at the opposite end of the sensor housing 36 proximate to the exterior of the valve assembly 24 is about 0.470".

Figure 5:
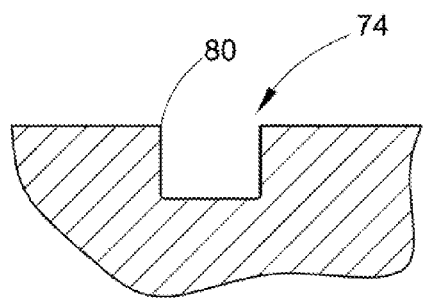
FIGS. 5 and 6 illustrate schematic representations of exemplary cross-sections of grooves in a sensor housing and the valve assembly in accordance with one embodiment of an apparatus illustrating principles of the present invention.
Figure 6:
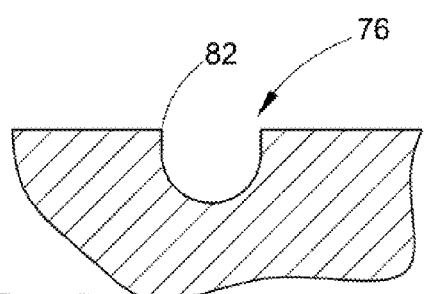

As illustrated in FIGS. 2 and 3, a seal 72 (e.g., an o-ring) cooperates with both the channel groove 32 and the sensor groove 56 when the sensor housing 36 is seated in the channel 30. For example, once the sensor housing 36 is seated in the channel 30, the seal 72 seats in both the channel groove 32 and the sensor groove 56 when the sensor housing 36 is seated in the channel 30. The sensor groove 56 and/or the channel groove 32 may be generally square shaped (see the exemplar cross-section 74 in FIG. 5) or generally semi-circular shaped (see the exemplary cross-section 76 in FIG. 6) with respective corners 80 (see FIG. 5), 82 (see FIG. 6) shaped to not allow the o-ring 72 to escape. For example, the corners 80 (see FIG. 5), 82 (see FIG. 6) generally form right angles. Therefore, the respective shapes (including the corners) of the sensor groove 56 and the channel groove 32 act as a means for retaining the o-ring 72 between the wall of the channel 30 and the sensor housing 36 and for retaining the o-ring 72 in the sensor groove 56 and the channel groove 32 to seat the sensor housing 36 in the channel 30.

In one embodiment, the o-ring 72 seats in the circular sensor groove 56 and in the circular channel, groove 32. In one example, an internal diameter of the o-ring 72 is about 0.362", and a diameter of a cross-section of the o-ring 72 is about 0.103". Therefore, in the example described above in which the width of the sensor groove 56 is 0.090", the diameter of the cross-section of the o-ring 72 of about 0.103" is greater than the width 62 of the sensor groove 56 of about 0.090". It is also contemplated that the internal diameter of the o-ring 72 is between about 0.8 and about 0.9 times the diameter of the end 64 of the sensor housing 36 proximate to the valve component 40. The o-ring 72 material is rubber, for example nitrile due to its wearability. The cross-sectional shape of the seal 72 can be a circle or another shape that will not shear under pressure.

To seat the sensor housing 36 in the channel 30, the o-ring 72 is positioned proximate to, or around and/or in, the channel groove 32. Once the o-ring 72 is positioned proximate to, or around and/or in, the channel groove 32, the sensor housing 36 is inserted into the channel 30. More specifically, the relatively smaller end 64 of the frusto-conically shaped portion of the sensor housing 36 is inserted into the channel 30 from the exterior side 70 of the valve assembly 24.

While the sensor housing 36 is inserted into the channel 30, the seal 72 (o-ring) engages the wall of the sensor housing 36. When the o-ring 72 reaches the sensor groove 56, the wall of the channel 30 urges the o-ring 72 to expand into the sensor groove 56 for seating the sensor housing 36 in the channel 30. If the o-ring 72 was not positioned in the channel groove 32 (i.e., if the o-ring 72 was positioned proximate to or around the channel groove 32), the sensor housing 36 and the wall of the channel 30 cooperate to urge the seal 72 into the channel groove 32 as the sensor housing 36 is inserted into the channel 30. The o-ring 72 simultaneously engages both the sensor groove 56 and the channel groove 32 once the sensor housing 36 is seated in the channel 30. The relatively smaller sensor groove 56 keeps the sensor 34 from being dislodged by the pressure and keeps the sensor 34 from being moved out of a position to sense the valve component 40.

When the sensor housing 36 is seated in the channel 30 (i.e., when the o-ring 72 simultaneously engages both the sensor groove 56 and the channel groove 32), the o-ring 72 cooperates with both the sensor groove 56 and the channel groove 32 to create a pneumatic seal between the sensor housing 36 and the wall of the channel 30. At the same time, the o-ring 72 cooperates with both the sensor groove 56 and the channel groove 32 to retain the sensor housing 36 in the channel 30. Therefore, the o-ring 72 acts as a means for creating a pneumatic seal between the sensor housing 36 and the wall of the channel 30 and as a means for retaining the sensor housing 36 in the channel 30. As discussed above, the channel groove 32 may be different shapes (e.g., generally square or generally semi-circular) and the sensor groove 56 may be different shapes (e.g., generally square or generally semi-circular). The channel groove 32 and the sensor groove 56, and their respective shapes, may also act as a means for creating the pneumatic seal between the sensor housing 36 and the will of the channel 30 and as a means for retaining the sensor housing 36 in the channel 30. The seal 72 withstands pressures in excess of the supply pressure in the volume 52, which is about 150 psi.

Since the o-ring acts to retain the sensor housing 36 in the channel 30, the valve assembly 24 may be manufactured with the channel 30 including the channel groove 32 (instead of a first set of threads) and the sensor housing 36 may be manufactured with the sensor groove 56 (instead of a second set of threads that cooperatively mate with the first set of threads). Manufacturing the channel groove 32 and the sensor groove 56 is less complex and less expensive than manufacturing the channel 30 and the sensor housing 36 with special accommodations such as threads that mate with each other. Therefore, manufacturing the channel groove 32 in the channel 30 and the sensor groove 56 in the sensor housing 36 reduces the overall complexity, part count, assembly time, and cost of the valve assembly 24. No other means of sealing and fastening the sensor in the valve assembly is required.

Over time, the seal 72 may become warn. Therefore, it is contemplated that once the seal 72 is seated, the sensor housing 36 (and the sensor 34) may be removed from the channel 30 and replaced with a new sensor housing (and sensor) and/or seal without removing the plate 28 from the valve assembly 24. In another embodiment, where no sensing of the valve component is desired, the sensor body 36 may be replaced with a slug of a similar shape and, optionally, corresponding grooves.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A valve assembly, comprising:
   a plate defining a wall of a housing, a valve component included in the housing, a position of the valve component setting a state of the valve assembly;
   a channel defined through the wall of the housing;
   a channel groove defined in a wall of the channel;
   a sensor housing including a sensor detecting the state of the valve assembly;
   a sensor groove along the sensor housing, a diameter of the sensor housing at a first end of the sensor groove being substantially equal to a diameter of the sensor housing at a second end of the sensor groove, the first and second ends being at opposite ends of the sensor groove along the sensor housing, and the sensor housing is substantially frusto-conically shaped along a portion of the housing adjacent to and extending away from the first end of the sensor groove; and
   a seal cooperating with both the channel groove and the sensor groove when the sensor housing is seated in the channel to both create a pneumatic seal between the sensor housing and the wall of the channel and retain the sensor housing in the channel.

2. The valve assembly as set forth in claim 1, wherein:
   the channel is substantially cylindrically shaped and sized to receive the sensor housing;
   the channel groove defines a circle along the wall of the channel;
   the sensor groove defines a circle along an exterior of the sensor housing; and
   the seal seats in both the channel groove and the sensor groove when the sensor housing is seated in the channel to both create the pneumatic seal between the seal and the wall of the channel and retain the sensor housing in the channel.

3. The valve assembly as set forth in claim 2, wherein:
   the seal is an o-ring.

4. The valve assembly as set forth in claim 3, wherein:
   a width of the sensor groove is about 0.090";
   a width of the channel groove is about 0.150"; and
   a diameter of a cross-section of the o-ring is about 0.103".

5. The valve assembly as set forth in claim 4, wherein:
   an internal diameter of the o-ring is about 0.362".

6. The valve assembly as set forth in claim 4, wherein:
   an internal diameter of the o-ring is about 0.8 to 0.9 times a diameter of an end of the sensor housing proximate to the valve component.

7. The valve assembly as set forth in claim 3, wherein:
   a width of the sensor groove is about 0.090";
   a width of the channel groove is greater than about 150% of a width of the sensor groove; and a diameter of a cross-section of the o-ring is greater than the width of the sensor groove.

8. The valve assembly as set forth in claim 3, wherein:
the o-ring simultaneously engages a wall of the channel groove and a wall of the sensor groove for creating the pneumatic seal between the o-ring and the wall of the channel and retaining the sensor housing in the channel.

9. The valve assembly as set forth in claim 1, wherein:
the valve component includes a ferrous material; and
the sensor detects a position of the valve component.

10. The valve assembly as set forth in claim 1, wherein:
a width of the channel groove is greater than about 150% of the width of the sensor groove.

11. The valve assembly as set forth in claim 1, wherein:
respective diameters of the housing at both ends of the channel groove are substantially equal.

12. A sensor, comprising:
a housing around the sensor, the housing being sized to be received in a channel of a valve assembly; and
a sensor groove along the sensor housing sized to receive a seal, the seal also being received in a channel groove in the channel and cooperating with both the sensor groove and the channel groove for creating a pneumatic seal between the seal and a wall of the channel and retaining the sensor housing in the channel, a diameter of the sensor housing at a first end of the sensor groove being substantially equal to a diameter of the sensor housing at a second end of the sensor groove, the first and second ends being at opposite ends of the sensor groove along the sensor housing, and the sensor housing is substantially frusto-conically shaped along a portion of the housing adjacent to and extending away from the first end of the sensor groove.

13. The sensor as set forth in claim 12, wherein:
the sensor groove extends circularly around the housing.

14. The sensor as set forth in claim 13, wherein:
a width of the sensor groove is about 0.090"; and
the width of the sensor groove is smaller than a width of the channel groove.

15. The sensor as set forth in claim 14, wherein:
the width of the channel groove is greater than about 1½ times the width of the sensor groove.

16. The sensor as set forth in claim 15, wherein:
the seal is an o-ring; and
a diameter of a cross-section of the o-ring is greater than the width of the sensor groove.

17. A valve assembly, comprising:
a valve housing;
a shuttle included in the housing, a position of the shuttle setting a state of the valve assembly;
a channel defined through the valve housing;
a circular channel groove defined in a wall of the channel;
a sensor housing, including a sensor detecting the position of the shuttle, sized to be received in the channel;
a circular sensor groove along an exterior surface of the sensor housing, a diameter of the sensor housing at a first end of the sensor groove being substantially equal to a diameter of the sensor housing at a second end of the sensor groove, the first and second ends being at opposite ends of the sensor groove along the sensor housing, and the sensor housing is substantially frusto-conically shaped along a portion of the housing adjacent to and extending away from the first end of the sensor groove; and
an o-ring cooperating with both the channel groove and the sensor groove when the sensor housing is received in the channel to both create a pneumatic seal between the seal and the wall of the channel and retain the sensor housing in the channel.

18. The valve assembly as set forth in claim 17, wherein:
the sensor senses the position of the shuttle for confirming operation of the valve assembly.

19. The valve assembly as set forth in claim 17, wherein:
the shuttle includes ferrous material; and
the sensor is a non-contacting sensor that senses a change in a magnetic field created by a proximity of the shuttle to the sensor.

20. The valve assembly as set forth in claim 17, wherein:
the valve housing is metallic; and
the sensor is positioned within about 0.05 inches to the shuttle.

21. A method of assembling a valve assembly, the method comprising:
positioning an o-ring in a channel defined in a housing of the valve assembly;
inserting a sensor housing, including a sensor, into the channel so that the sensor housing engages the o-ring;
seating the o-ring in a channel groove in a wall of the channel;
seating the o-ring in a sensor groove, along the sensor housing, a diameter of the sensor housing at a first end of the sensor groove being substantially equal to a diameter of the sensor housing at a second end of the sensor groove, the first and second ends being at opposite ends of the sensor groove along the sensor housing, the sensor housing is substantially frusto-conically shaped along a portion of the housing adjacent to and extending away from the first end of the sensor groove, and once the o-ring is seated in both the channel groove and the sensor groove, the o-ring creating a pneumatic seal between the sensor housing and the wall of the channel and retaining the sensor housing in the channel.

22. The method of assembling a valve assembly as set forth in claim 21, wherein:
the positioning step includes:
positioning the o-ring proximate the channel groove;
the step of seating the o-ring in the channel groove and the step of seating the o-ring in the sensor groove occur during the step of inserting the sensor housing into the channel.

23. A valve assembly, comprising:
a plate defining a wall of a housing, a valve component included in the housing, a position of the valve component setting a state of the valve assembly;
a channel defined through the wall of the housing;
a channel groove defined in a wall of the channel;
a sensor housing including a sensor detecting a state of the valve assembly based on the position of the valve component;
a sensor groove along the sensor housing, a diameter of the sensor housing at a first end of the sensor groove being substantially equal to a diameter of the sensor housing at a second end of the sensor groove, the first and second ends being at opposite ends of the sensor groove along the sensor housing, and the sensor housing is substantially frusto-conically shaped along a portion of the housing adjacent to and extending away from the first end of the sensor groove; and
means for creating a pneumatic seal between the sensor housing and the wall of the channel and retaining the sensor housing in the channel.

24. The valve assembly as set forth in claim 23, wherein the means for creating the pneumatic seal between the sensor housing and the wall of the channel and retaining the sensor housing in the channel includes:
    a seal cooperating with both the channel groove and the sensor groove when the sensor housing is seated in the channel.
25. The valve assembly as set forth in claim 24, wherein: the seal is an o-ring.
26. The valve assembly as set forth in claim 25, wherein:
a width of the sensor groove is about 0.090";
a width of the channel groove is about 0.150"; and
a diameter of a cross-section of the o-ring is about 0.103".
27. A valve assembly, comprising:
    a plate defining a wall of a housing, a valve component included in the housing, a position of the valve component setting a state of the valve assembly;
    a channel defined through the wall of the housing;
    a sensor housing including a sensor detecting a state of the valve assembly based on the position of the valve component;
    a seal cooperating with both the channel and the sensor housing to both create a pneumatic seal between the sensor housing and a wall of the channel and retain the sensor housing in the channel; and
    means for retaining the seal between the wall of the channel and the sensor housing, the means for retaining including:
        a sensor groove along the sensor housing, a diameter of the sensor housing at a first end of the sensor groove being substantially equal to a diameter of the sensor housing at a second end of the sensor groove, the first and second ends being at opposite ends of the sensor groove along the sensor housing, and the sensor housing being substantially frusto-conically shaped along a portion of the housing adjacent to and extending away from the first end of the sensor groove.
28. The valve assembly as set forth in claim 27, wherein the means for retaining the seal between the wall of the channel and the sensor housing further includes:
    a channel groove along the wall of the channel;
    wherein the seal cooperates with both the channel groove and the sensor groove for seating the sensor housing in the channel.
29. The valve assembly as set forth in claim 28, wherein both the channel groove and the sensor groove include:
    means for retaining the seal in the respective groove.
30. The valve assembly as set forth in claim 28, wherein:
    the channel groove is one of generally square shaped and generally semi-circular shaped; and
    the sensor groove is one of generally square shaped and generally semi-circular shaped.

\* \* \* \* \*